July 29, 1924.
W. F. SCHLEICH
BIRD CAGE
Filed Dec. 2, 1922
1,502,748
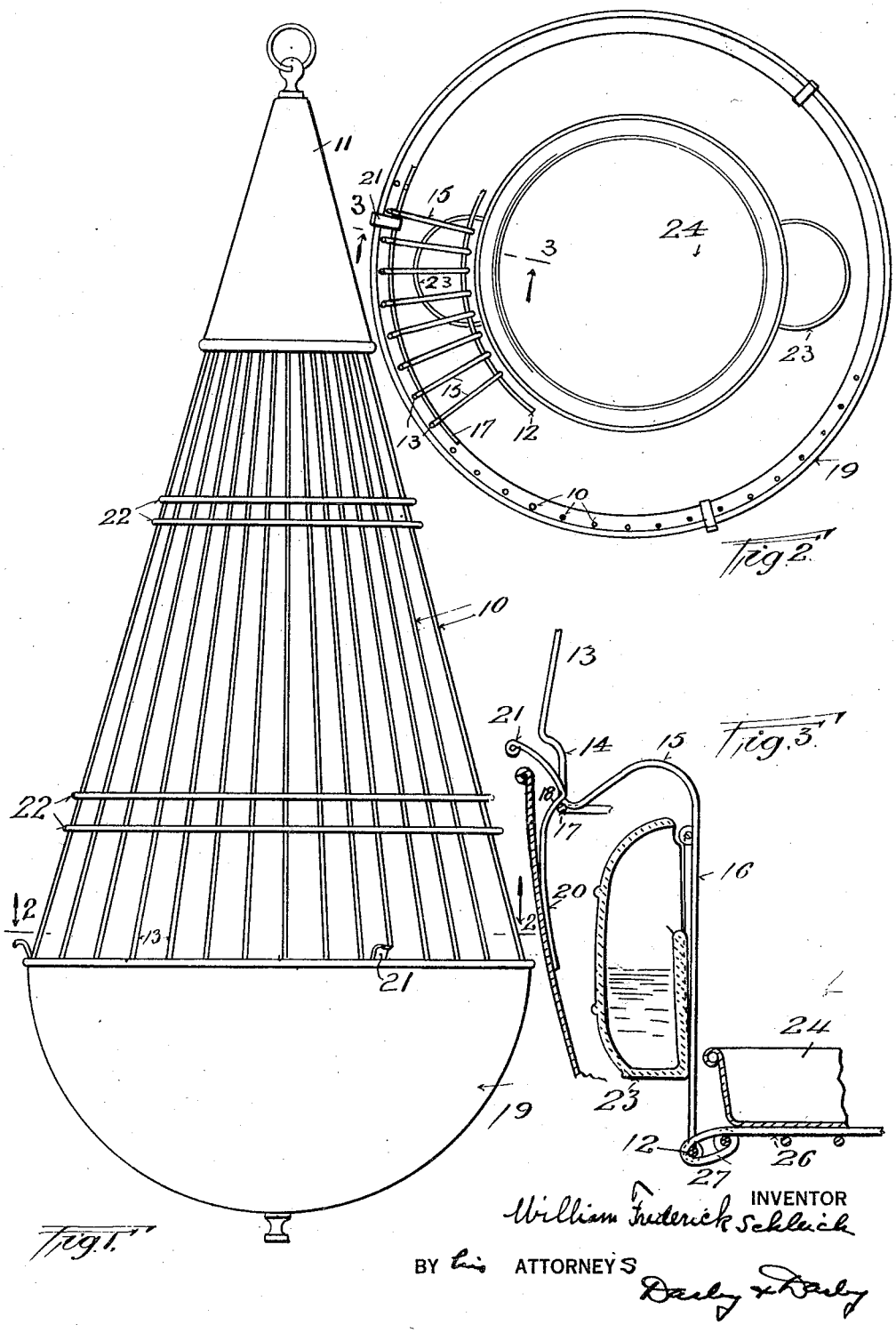

Patented July 29, 1924.

1,502,748

UNITED STATES PATENT OFFICE.

WILLIAM FREDERICK SCHLEICH, OF NEW YORK, N. Y., ASSIGNOR TO SCHLEICH STUDIOS, INC., OF NEW YORK, N. Y., A CORPORATION OF NEW YORK.

BIRD CAGE.

Application filed December 2, 1922. Serial No. 604,481.

*To all whom it may concern:*

Be it known that I, WILLIAM FREDERICK SCHLEICH, a citizen of the United States, residing at 2946 Mathews Ave., New York, county of Bronx, State of New York, have made a certain new and useful Invention in Bird Cages, of which the following is a specification.

This invention relates to improvements in bird cages, and has for its object the production of a cage construction which is provided with special protective means, is readily and cheaply made, and which has a neat and attractive appearance.

A further object includes the provision of a removable hemispherical shield for the lower part of the cage to conceal from view said portion of the cage.

Other objects will appear hereinafter, and I attain these results by the construction shown in the accompanying drawing, in which Fig. 1 is a view in elevation;

Fig. 2 is a sectional view taken on lines 2—2 of Fig. 1; and

Fig. 3 is a view taken on lines 3—3 of Fig. 2.

Like numbers refer to similar parts throughout the several views.

The essential parts of my cage construction, to which, however, I do not desire to be limited, consist of symmetrical side bars and end shields. The side bars 10 are fastened together within the conical hood 11, at one end, and at the other end terminate, in the preferred construction, on a spacer ring 12. These bars comprise a straight section 13, an offset portion 14, and an inturned part 15, which ends in a straight portion 16. A reinforcing ring 17 holds the bars in proper relation and offers attaching means for hooks or fastening means 18. These fastening means are made of resilient material, and are secured to the hemisphere 19 at suitable points 20. The hooks may be further provided with an extension 21 for releasing the hemisphere.

The side bars are further supported by a suitable number of wires 22.

Within the hemi-spherical shield, and connected to the lower part of the cage, are found the water bottle or bottles, 23, and the pan 24. The water bottle may be attached in any suitable way, and the pan rests upon the cage bottom 26. The cage bottom is constructed to swing on a hinge construction 27 to thereby permit removal of the pan for cleaning, or for other purposes. To supply food and water, or to open the cage, the hemi-spherical shield is removed by depressing the catch 21, and permitting the shield to drop down. This leaves the lower part of the cage exposed for the purposes aforestated. By having the shield surrounding the lower part of the cage, the bird is protected, and no food is scattered about. The upper shield, besides serving as a convenient means for support, also affords a retreat for the bird, and both shields, taken with the exposed straight line side bars, afford a pleasing symmetrical construction which besides being useful is also ornamental.

While I have described an embodiment of my invention, and have shown one form of its application, I do not thereby desire to be understood as having thus limited myself unnecessarily. What I claim, therefore, as new and useful, and of my own invention, and desire to secure by Letters Patent, is:

A bird cage construction, comprising a conical shield, an opaque hemispherical shield, bars radiating from said conical shield and extending into said hemispherical shield, said bars being attached to said conical shield, and terminating in set-off portions within said hemispherical shield, receptacles on said off-set portions, and means for holding said hemispherical shield releasably over the said off-set portions.

In testimony whereof I have hereunto set my hand on this 6th day of July A. D., 1922.

WILLIAM FREDERICK SCHLEICH.